United States Patent

Trefzger et al.

[15] 3,637,164

[45] Jan. 25, 1972

[54] CASSETTE FOR RECORDING MEDIUM

[72] Inventors: Edwin W. Trefzger, Ilion; Bruce Crimmins, Little Falls; Raymond A. Plunkett, Herkimer; Richard J. Petkovsek; Leslie Phillip Finster, both of Ilion, all of N.Y.

[73] Assignee: The Singer Company

[22] Filed: Mar. 23, 1970

[21] Appl. No.: 21,564

[52] U.S. Cl. ............................................242/195, 242/198
[51] Int. Cl. ....................................G03b 1/04, G11b 15/32
[58] Field of Search ...........................242/76, 195, 197–200

[56] References Cited

UNITED STATES PATENTS

| | | | |
|---|---|---|---|
| 3,119,574 | 1/1964 | Laa | 242/195 |
| 3,008,661 | 11/1961 | Estes et al. | 242/76 X |
| 3,528,626 | 9/1970 | Bumb, Jr. | 242/192 |

*Primary Examiner*—Leonard D. Christian
*Attorney*—George W. Killian, Patrick J. Schlesinger, Charles R. Lepchinsky and Jay M. Cantor

[57] ABSTRACT

A cassette for storing a recording medium which may be selectively extracted from and returned to the cassette. An eyelet is attached to a leader of the recording medium for providing a means to grasp the recording medium and extract it from the cassette. A spring-biased latch arm clutches the eyelet and retains it in its home position when the cassette is not in position on an associated tape deck. When tape is extracted from the cassette, the latch arm pivots and an extension of the latch arm enters an aperture in the frame of the tape deck to inhibit removal of the cassette from the deck. The tape deck includes first and second sensors for sensing the presence or absence of first or second apertures in the cassette. One or more of the cassette apertures may be selectively blocked to provide information to the associated equipment indicative of selected characteristics of the cassette and/or of the recording medium contained therein. In addition to providing a latching function, the latch arm, in the pivoted position, may operate a switch indicative of the fact that recording medium has been extracted from the cassette.

9 Claims, 6 Drawing Figures

INVENTORS
LESLIE P. FINSTER
RICHARD J. PETKOVSEK
RAYMOND A. PLUNKETT
BRUCE R. CRIMMINS
EDWIN W. TREFZGER

BY George W. Killian
AGENT

CASSETTE FOR RECORDING MEDIUM

BACKGROUND OF THE INVENTION

The use of magnetic and/or perforated tape as a recording medium is too well known in the art to require an explanation of the principles involved. In the case of perforator tape, it is customary to stop and start the tape for each character that is to be recorded. Similar techniques are sometimes used with magnetic tape and sometimes the magnetic tape is operated at a constant speed. The present invention contemplates the use of magnetic tape which may be operated either intermittently or at a constant speed as suits the convenience of associated equipment.

When magnetic tape was first used, it was necessary to manually feed and thread the tape through the various pinch rollers and tension arms and in position past the record and/or erase heads to the takeup reel. In certain types of applications it is known to provide a closed loop of tape contained in a cassette which is inserted into the associated apparatus and the information recorded on the tape read therefrom and/or information recorded on the tape. More recently, there has been developed a cassette for holding a length of recording medium which may be extracted from the cassette and automatically fed through the necessary rollers and tension arms, past the record and/or erase heads to the takeup reel. In a similar manner the tape may be restored to the cassette. Such systems caused certain difficulties in that it was possible to inadvertently erase material from a tape that should have been preserved. Another difficulty resided in the problem arising when an attempt was made to remove a cassette into which the tape had not been fully restored. A variety of other problems existed, such as, the inadvertent winding of the tape into the cassette so that no leader remained for extracting the tape; or of having the leader of the tape work its way out of the cassette during normal handling or transporting of the cassette when it is not in position on the tape deck.

It is an object of the present invention to overcome the inconveniences and difficulties associated with the prior art devices.

It is a more specific object of this invention to provide a new and improved cassette.

It is a more specific object of this invention to provide a new and improved cassette for retaining a reel of magnetic tape.

It is another object of this invention to provide signals between the cassette and the tape deck to indicate when the tape is in its at home position in the cassette and when any tape is extracted from the cassette.

It is another object of the invention to provide communication between the cassette and the tape deck indicative of selected characteristics of the tape contained within the cassette.

It is another object of the invention to lock the cassette against removal from the tape deck when any of the tape has been extracted from the cassette.

THE DRAWING

The drawing comprises a collection of figures wherein.

As is customary, like parts will always be represented by like numbers in all views.

Figures 1, 5:
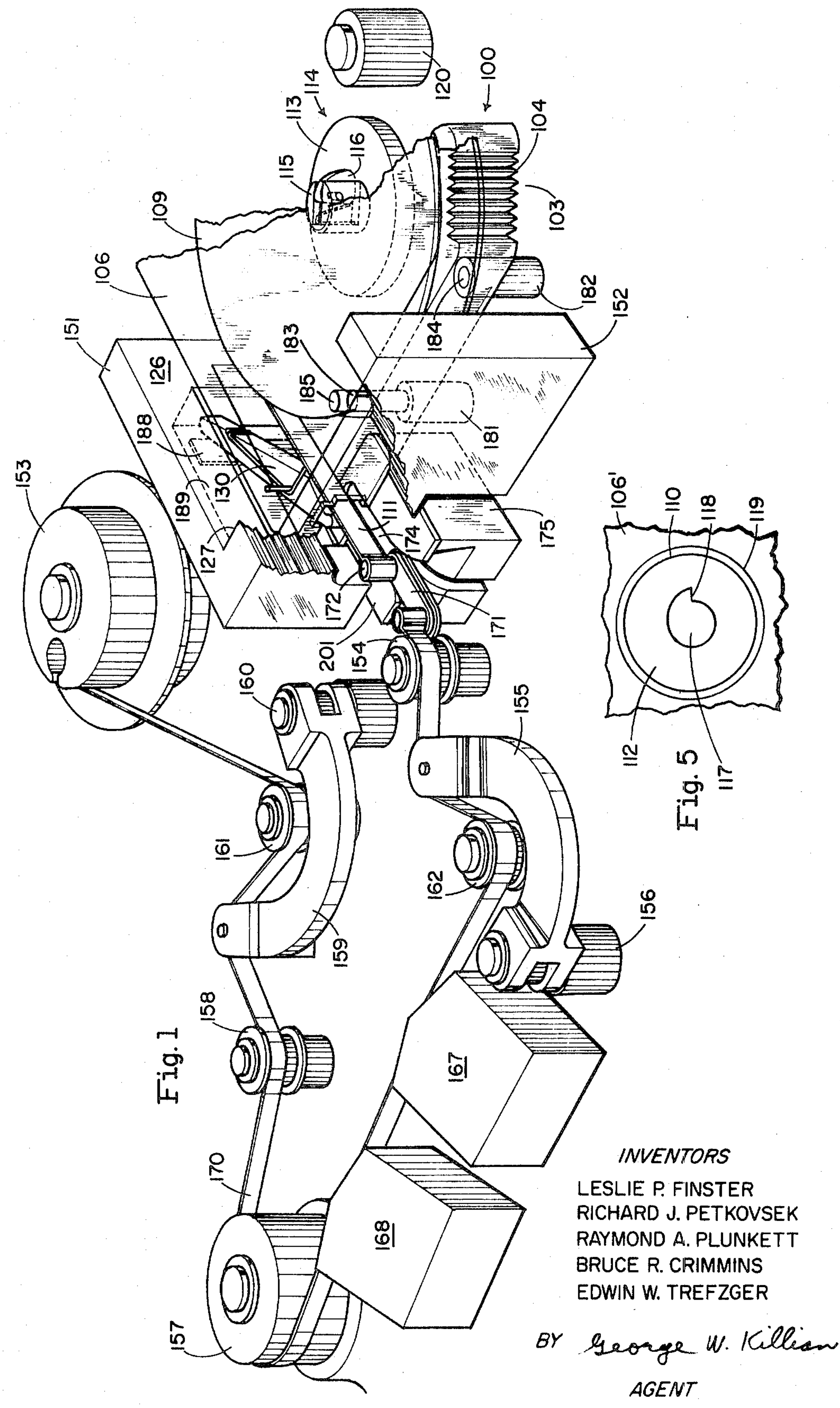
FIG. 1 is a view which illustrates a portion of a tape deck and shows a cassette associated with the tape deck and with only a small portion of the tape within the cassette withdrawn therefrom.
FIG. 5 shows a detail of the hub of the tape reel in the cassette.
Figure 2:
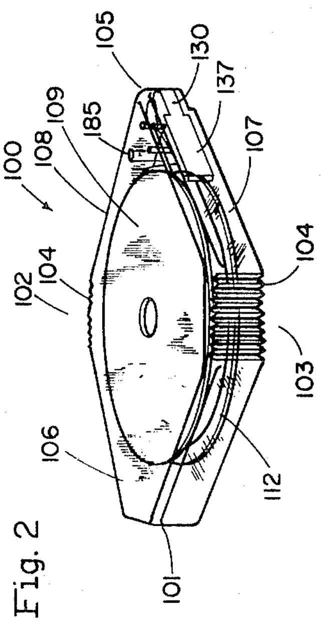
FIG. 2 shows a view of the tape cassette.

The cassette of the present invention may take any of a wide variety of suitable forms which adapt it for convenient storage and handling. One convenient shape for the cassette is illustrated in FIG. 2 wherein it may be seen that the cassette 100 has a generally square appearance but with three of the corners 101, 102, and 103 cut off. The diametrically opposed corners 102 and 103 are provided with serrations 104 to suggest and provide handling or grasping surfaces. The removal of corners 101, 102 and 103 leaves only one corner 105 with a 90° angle thereby suggesting a leading corner or arrow and it is this corner 105 which is inserted into the appropriate receiving area of the tape deck. The cassette 100 comprises a top surface 106 and a corresponding bottom surface 106' (shown partially in FIG. 5) together with sidewalls 107 and 108. Captured within the cassette 100 is a reel 109 having a conventional hub 110 on which the tape 111 is wound. There is a central opening 119 (see FIG. 5) in the bottom surface 106' of the cassette 100 so that at least a portion of the bottom flange 112 of reel 109 may rest against surface 113 of turntable 114 and so that spindle 115 together with its associated pivoted key 116 may slip into the hole 117 of hub 110. As may be seen in FIG. 5, the hole 117 of hub 110 is shaped so that the pivoted and spring biased key 116 in spindle 115 may extend beyond the diameter of spindle 115 and engage surface 118 so that rotation of turntable 114 will cause key 116 to engage surface 118 and thereby rotate reel 109 when turntable 114 is rotated in an appropriate direction. The key 116 is pivoted and spring biased so that the reel 109 may be inserted on the spindle 115 irrespective of the then current relationship between the angular position of the key 116 and its engaging surface 118.

Figure 3:
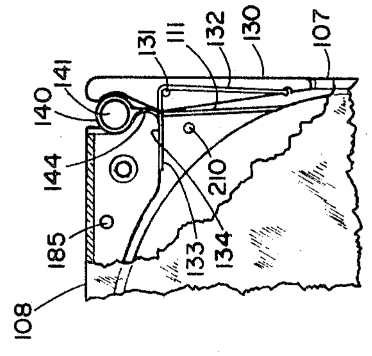
FIG. 3 shows a view of a portion of the tape cassette with the tape in its at home or rest position.

The placement of the cassette 100 on the tape deck is also guided by the surfaces 126 and 127 which come into contact with sidewalls 107 and 108, respectively, of the cassette 100. As may be seen in FIGS. 2, 3 and 4, the cassette 100 has a latch arm 130 which is pivotally supported at 131 and spring biased for counterclockwise rotation above pivot 101 by wire spring 132 which has an end 133 in contact with an internal wall 134 of the cassette 100. The other end 135 of the wire spring 132 is engaged in a notch 136 of latch arm 130. Coupled to the leader 111 of a recording medium is an eyelet 140 having a hole 141. The upper end of the latch arm 130 has a notch 142 with a concave configuration. When the recording medium and the leader 111 are drawn into the cassette 100, the eyelet 140 engages the latch arm 130 and pivots it about pivot point 131 thereby permitting the eyelet 140 to be withdrawn inside the perimeter of the cassette 100. However, the opening 143 formed between the latch arm 130 and the wall 144 is too narrow to permit the passage of eyelet 140 to the interior of the cassette 100. Accordingly, the eyelet 140 is captured between the wall 144 and the concave notch 142 of latch arm 130 and retained there by the shape of the notch 142 and the pressure applied by the force of wire spring 132. With the eyelet 140 thus captured, the latch arm 130 has a surface 137 which is contiguous with sidewall 107.

As already indicated, the cassette 100 is inserted on the tape deck with the corner 105 of the cassette 100 pointing towards the corner formed by surfaces 126 and 127. The assembly of a typical tape deck is more fully shown in FIG. 1 which has certain portions broken away in order to increase clarity. As illustrated in FIG. 1, a small length of the leader tape 111 has been withdrawn from the cassette 100. Although the tape deck does not form an important part of the present invention, selected parts of the tape deck are shown in order to illustrate a more complete unit. For example, cassette positioning guide arms 151 and 152 are rigidly and fixedly supported to the tape deck surface (not shown). As previously mentioned, the turntable 114 is also rotatably mounted on the tape deck. The tape 111 when extracted from the cassette 100 may be would on takeup reel 153 which is more fully described in the copending application of E. Trefzger and B. Crimmins Ser. No. 21,565, filed Mar. 23, 1970.

The path of the tape 111 as it proceeds from the cassette 100 to the takeup reel 153 is routed past the idler guide pulley 154, a pulley (not shown) on tape tension arm 155 which is pivotally supported at 156 and spring biased to pivot counterclockwise about pivot 156 when viewed from the top, and past idler guide pulley 162 to heads 167 and 168 which may be selectively used for erasing, writing, or reading information from the tape 111, and around the drive roll 157 which may be selectively rotated in either the clockwise or counterclockwise directions, past idler guide pulley 158 and another pulley (not shown) on another tension arm 159 mounted for spring biased clockwise pivotal motion about pivot point 160 and idler guide pulley 161 to the takeup reel 153. There is a piece of leader tape 170 associated with the takeup reel 153 and which is threaded through the tape path during initial assembly. A leader coupling element 171 couples the leader 170 with the leader 111 in the manner to be explained more fully hereinbelow.

As indicated, the rotation of the power drive roll 157 will extract the recording medium 111 from the cassette 100 and allow it to be wound on the takeup reel 153; or by rotating the spindle 115 in an appropriate direction the recording medium may be withdrawn from the takeup reel 153 and returned to the cassette 100. To this end, the takeup reel 153 and the turntable 114 may be selectively driven in appropriate directions from a power shaft by means of a slip clutch so that an approximately constant tension is maintained on the tape 111. When tape is being withdrawn from the cassette 100, a slight drag is applied to the turntable 114; and in a similar manner, when tape is being returned to the cassette 100, a slight drag is applied to the takeup reel 153.

The cassette 100 is adapted for use with a system which may make simultaneous use of a plurality of the cassettes 100. That is, the tape deck may have facilities for mounting two or more individual cassettes 100. In such structures it may be desirable to merge information recorded on first and second tapes in first and second cassettes onto a third tape in a third cassette. Or, it may be desirable to transfer selected information from a first tape in a first cassette to a third tape in a third cassette in accordance with detailed instructions provided by coded recordings on a second tape in a second cassette. Various other combinations of using a plurality of cassettes in a single system will occur to those familiar with such systems. As indicated, such systems may include an instruction tape or some other tape from which it is highly undesirable to erase information inadvertently. Accordingly, as will be shown hereinbelow, provisions are made for preventing the inadvertent erasure of data from such tapes. To this end there is provided on the tape deck first and second sensors 181 and 182. Each sensor 181 and 182 has a plunger or sensing finger 183 and 184, respectively, which is spring biased in an upward direction. When the cassette 100 is placed on the tape deck, the sensor plungers 183 and 184 will be pushed in a downward direction unless there is an aperture, such as 185, in the cassette 100 which accommodates the plunger in its upward position. By way of illustration, the plunger 184 in FIG. 1 is shown depressed while the plunger 183 is shown in the upward position. Aperture 185 in cassette 100 (see FIGS. 2, 3 and 4) accommodates the plunger 183 to permit it to remain in the upward position. Associated with each sensor plunger 183 and 184 is an individual switch (not shown) which senses the upward or downward position of their respective plungers 183 and 184 and thereby provide appropriate electrical signals indicative of selected characteristics of the cassette 100 and/or the nature of the information recorded on the tape 111 contained therein all in accordance with a predetermined coded arrangement.

In normal operation, the plungers 183 or 184 of one of the sensors 181 or 182 is depressed whenever a cassette 100 is placed in position on the tape deck. This is done in order to provide a signal indicative of the fact that a cassette 100 has been placed in position. Accordingly, as illustrated in FIG. 1, the placement of the cassette 100 on the tape deck will cause the depression of plunger 184 of sensor 182 thereby operating an electrical switch (not shown) to provide an appropriate electrical signal indicative of the fact that the cassette 100 is in position. If it were desired to use the sensor 182 for some other purpose, it would be possible to provide an appropriate aperture in the cassette 100 which would allow placement of the cassette 100 without depression of the plunger 184. Or, if desired, a plug may be placed in the aperture 185 in the cassette 100 to cause depression of the plunger 183 of sensor 181 when the cassette is placed on the tape deck. Depending upon the assigned functions of the sensors 181 and 182 and the information which it is desired to convey relative to the characteristics of the cassette 100 placed in the position, may be selectively plugged or blocked so that the plungers 183 and 184 will be depressed when the cassette 100 is placed in position. For the present discussion, it will be assumed that each cassette 100 is manufactured with an aperture 185 and that when the plunger 183 finds the aperture 185, it provides an electrical indication that the tape within that cassette 100 may be erased and/or have new information recorded thereon. However, if the aperture 185 is blocked so that when the cassette 100 is placed into position on the tape deck the plunger 183 is depressed, there is then provided an electrical signal which is indicative of the fact that the tape in that cassette is of a special nature and that the information of said tape should not be erased nor any new information written thereon. Those familiar with the art of erasing and recording information on tape will be familiar with the manner in which the operation of a single switch by plunger 183 can provide a signal to inhibit such erasure and/or writing.

In addition to providing the signals already mentioned, it is desirable for the tape deck to have an electrical indication of whether or not any tape has been extracted from the cassette 100. As already explained herein above, the latch arm 130 will be pivoted about pivot point 131 whenever any of the tape 111 is extracted from the cassette 100. The pivoting of the latch arm 130 initiates the actuation of a switch (not shown) which is actuated by switch-actuating arm 188 when latch arm 130 contacts said switch-actuating arm 188. Thus, by the means described, there is provided an electrical signal indicative of three specific items of information relative to the cassette 100; (a) an indication that the cassette 100 has been placed on the tape deck, information provided by the switch actuated by plunger 184; (b) an indication that tape has, or has not, been withdrawn from the cassette 100, such indication being provided by the switch actuated by switch-actuating arm 188; (c) an indication of the character of the information recorded on he tape within the cassette, such information being provided by the operation, or nonoperation, of the switch actuated by plunger 183.

Figure 6:
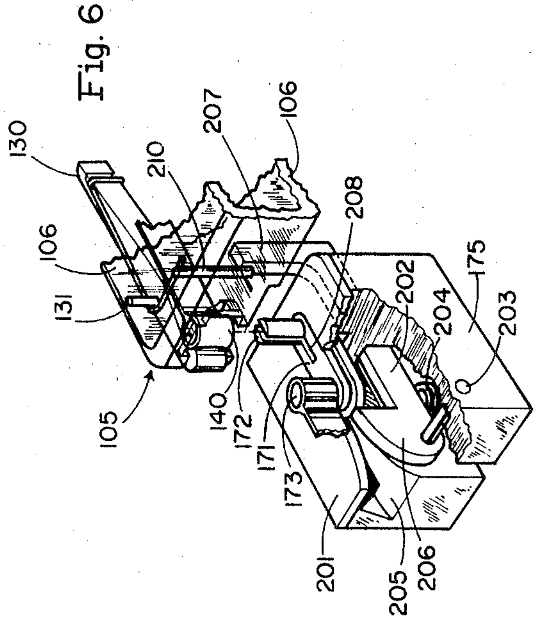
FIG. 6 is a view which illustrates the manner of retaining the leader hook and connecting it to the tape within the cassette.

As already indicated, a piece of leader tape 170 permanently associated with takeup reel 153 has permanently coupled to its end a takeup leader coupling 171 which is selectively coupled to leader 111 of the tape in the cassette 100. The manner in which the leader coupling 171 is selectively coupled to the leader tape 111 will now be described. It has already been explained that leader tape 111 has coupled to its end an eyelet 140 having a hole 141 therethrough. When the tape is drawn into the cassette 100, the eyelet 140 is securely clamped in a fixed position relative to the cassette 100 by the latch arm 130 and the concave notch 142 which clutches the eyelet 140 between the notch 142 and an opposing wall 144 of the cassette frame. The clutched position of the eyelet 140 is such that the hole 141 of the eyelet 140 is in the proper position so that a mating projection 172 on the leader coupling 171 may enter the hole 141 as the cassette 100 is placed in position on the tape deck with the sidewalls 107 and 108 in contact with frame member guiding surfaces 126 and 127, respectively, as the cassette 100 is lowered until the bottom flange 112 is in contact with surface 113 of turntable 114. If desired, other points of support 120 between the base of the tape deck and the underside of the cassette 100 may be provided to stabilize the cassette 100. A similar projection 173 on leader coupling 171 couples the leader coupling 171 to leader tape 170. When all of the tape 111 is drawn into the cassette 100, the leader coupling 171 is drawn into a slot 174 in base member 175 in much the same manner that a key in inserted into a slot in a shaft. The slot 174 in base member 175 is closed at the end closest to the cassette 100. Accordingly, when the tape 111 is drawn into the cassette 100, the leader coupling 171 is positioned in slot 174 of base member 175 with sufficient accuracy so that the projection 172 will be in accurate alignment with the hole 141 of eyelet 140 as a cassette 100 is placed in position on the tape deck. When the leader coupling 171 is in its at home position in slot 174 of base member 175, it is mechanically latched into that position by means of a simple latch as shown in FIG. 6 which is released when a cassette 100 is placed in position on the tape deck. More specifically, and as shown in FIG. 6, the base member 175 which is securely and immovably fixed to the tape deck comprises a plurality of parts including a top plate 201, latch 202, pivot rod 203, spring 204 and entrance chamber 205. Part of the base member 175 and top plate 201 are cut away to reveal the latch 202 and other components. As may be seen in FIG. 6, the latch 202 is pivoted on pivot rod 203 and includes latch hook 206 and operating arm 207. The latch 202 is biased in an upward direction by spring 204. As best seen in FIG. 1, the top plate 201 has a notch 174 which is slightly tappered and has its narrower end towards the cassette 100. The leader coupling 171 when drawn into the base member 175 is retained in its position against the longitudinal force of tension arms 155 and 159 by latch 202 and more specifically, by latch hook 206. When a cassette 100 is placed in position on the tape deck, the bottom surface 106' of the cassette 100 engages operating arm 207 thereby pivoting latch 202 about pivot rod 203 and removing latch hook 206 from the position which inhibits withdrawal of leader coupling 171. To avoid the danger of inadvertently releasing the leader hook 171 in response to an accidental or premature pivoting of latch 202, the leader hook 171 is also retained in the base member 175 and top plate 201 by a wedging action between the surfaces of leader hook 171 which engage the notch 174 in top plate 201. Additionally, the wedging action between the top plate 201 and leader hook 171 causes a slight compression of leader coupling projection 172 because of the slot 208 in projection 172. This compression of projection 172 facilitates the entry of projection 172 into hole 141 of eyelet 140. As the leader hook 171 is withdrawn from the slot 174 in top plate 201, the slightly compressed projection 172 expands to firmly grasp the interior surfaces of hole 141 in eyelet 140. Member 210 is a guide for guiding the path of the tape 111 as it is withdrawn from, or drawn into, the cassette 100.

As already indicated, the cassette 100 is placed in position on the tape deck by grasping the cassette 100 at corners 102 and 103 which have serrations 104 and placing the leading corner 105 in the corner formed by the meeting of surfaces 126 and 127; that is, with sidewall 107 in contact with surface 126 and sidewall 108 in contact with surface 127. As the cassette is pushed downward gently, the hole 141 of eyelet 140 will be entered by projection 172 of leader coupling 171, all as described above with respect to FIG. 6. The cassette 100 may be removed by grasping it at the corners 102 and 103 and lifting it up. However, when any of the tape 111 has been withdrawn from the cassette 100, the latch arm 130 will pivot about pivot point 131 so that a portion of latch arm 130 will extend into the aperture 189 which also contains the switch-actuating arm 188. With a portion of the latch arm 130 in the aperture 189, it is no longer possible to remove the cassette 100 from the tape deck since the latch arm 130 would immediately come in contact with the ceiling of the aperture 189 and thereby prevent any upward motion of the cassette 100. By this means, accidental damage to the tape in the cassette 100 is prevented since the cassette 100 cannot be removed unless the tape is completely drawn into the cassette 100.

The limit of downward motion of the cassette 100, as it is placed on the tape deck is controlled by the plane of the turn table 114 and the top surface of top plate 201 of base member 175 which contact the bottom flange 112 of the reel 109 and a portion of the bottom surface 106' of the cassette 100, respectively. In addition, other pedestals, such as, 120 could be provided on the tape deck to provide support and stability for the cassette 100.

Figure 4:
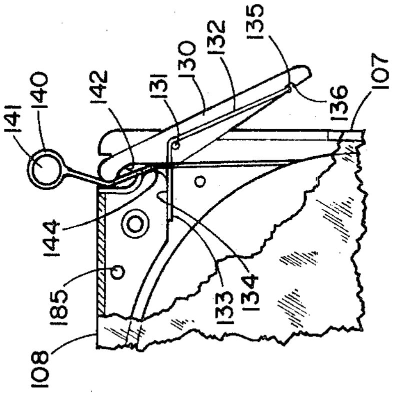
FIG. 4 is a view which shows the same portion of the cassette as FIG. 3 but with a small segment of the tape extracted from the cassette.

As will be understood from an examination of FIG. 4 and the shape of the hole 117 in the hub 110 of the reel 109, the cassette 100 may be placed on the turntable 114 without any predetermined angular relationship between the hole 117 and the key 116 in spindle 115. That is, as already explained, the key 116 is pivotally supported and spring biased so that as the spindle 115 enters the hole 117, the key 116 may be cammed and confined within the circular perimeter of the spindle 115. When the spindle 115 is driven in an appropriate direction to draw the tape 111 into the cassette 100, the spring bias on the key 116 will urge the key 116 outward and when the proper angular position is obtained between the key 116 and the hole 117 in hub 110, the key 116 will come in contact with the surface 118 of the hole 117 and create a driving relationship therebetween. The tape 111 is rewound into the cassette 100 by means of a power drive connected to spindle 115 and which causes the tape 111 to be rewound at a high speed. When the tape 111 is fully rewound into cassette 100, the eyelet 140 will assume the position shown in FIG. 3 and thereby pivot the latch arm 130 about pivot 131 so that latch arm surface 137 is once again contiguous with sidewall 107. Under these conditions, the latch arm 130 is no longer in contact with switch-actuating arm 188 and the switch actuated by said arm 188 is restored to its normal position. One typical function of the switch operated by arm 188 is to stop the application of drive power to spindle 115.

The cassette 100 may be made of any appropriate material and would readily lend itself to mass production from plastic parts. In order to readily identify the top and bottom of the cassette 100, a label might be attached to the top surface 106 of the cassette 100, and/or the top surface 106 might completely cover the hole 117 in hub 110 of reel 109. In addition, the top surface 106 of the cassette 100 would extend over the eyelet 140 so that if an attempt were made to place the cassette 100 on the tape deck with the cassette 100 in an upside down position, the spindle 115 would not be able to enter the hole 117 and the projection 172 on leader coupling 171 would not be able to enter the hole 141 of eyelet 140.

While there has been shown and described what is considered at present to be the preferred embodiment of the invention, modifications thereto will readily occur to those skilled in the related arts. For example, in another structure the external geometry of the cassette 100 could be materially modified or a variety of additional sensors might be added to sense additional apertures in the cassette 100 to further identify and distinguish the characteristics of the information recorded on the tape within the cassette. It is believed that no further analysis or description is required and that the foregoing so fully reveals the gist of the present invention that those skilled in the applicable arts can adapt it to meet the exigencies of their specific requirements.

What is claimed is:

1. A cassette bounded by a top and bottom and connecting sides for the storage of a flexible medium attached to and wound on a hub rotationally supported by said cassette, an opening in one of the sides of said cassette for permitting the egress of said medium in response to the application of a longitudinal force to the leading end of said medium, and the ingress of said medium in response to the power driven rotation of said hub, an eyelet coupled to the leading end of said medium and larger than said opening for preventing the ingress of said leading end of said medium through said opening, a pivotally supported latch arm coupled to said cassette and having one side of said latch arm forming one side of said opening, and another side of said latch arm forming a portion of one of said sides of said cassette, and spring bias means for biasing said latch arm to clutch said eyelet between said latch arm and an opposing portion of said cassette, and for pivoting said latch arm in response to the withdrawal of said eyelet from its clutched position, and wherein at least a portion of said latch arm extends outside the original boundary of the sides of said cassette.

2. The combination as set forth in claim 1 and including a deck on which said cassette may be placed, said deck and said cassette including cooperating indicia for restricting the orientation of said cassette to a single position, a first aperture in said cassette, a first sensor on said deck for sensing said aperture when said cassette is oriented on said deck in said single position.

3. The combination as set forth in claim 2 and including blocking means for closing said aperture.

4. The combination as set forth in claim 3 and including:

a second aperture in said cassette, and a second sensor on said deck for sensing said second aperture when said cassette is oriented on said deck in said single position.

5. The combination as set forth in claim 4 wherein said first aperture means is normally closed by said blocking means whereby first actuating means are provided for actuating said first sensing means by said blocking means to provide an indication that said cassette has been positioned in said single position.

6. The combination as set forth in claim 5 wherein said second aperture may be selectively closed by second blocking means whereby second actuating means are provided for actuating said second sensing means by said second blocking means to provide an indication of a first or second characteristic of said cassette when said second aperture is and is not blocked, respectively.

7. The combination as set forth in claim 1 and including a deck on which said cassette may be placed, said deck and said cassette including cooperating indicia for restricting the orientation of said cassette to a single position, aperture means included in said deck into which a portion of said latch arm pivots when said latch arms pivots in response to the urging of said spring bias means after the withdrawal of said eyelet from its said clutched position.

8. The combination as set forth in claim 7 wherein said aperture means in said deck and said latch arm cooperate when said latch arm is pivoted into said aperture in said deck to produce latching means for latching said cassette in said single position and to inhibit the removal of said cassettes from said single position.

9. The combination as set forth in claim 7 wherein said deck includes:

a. medium withdrawal means for grasping said eyelet and applying a longitudinal force to withdraw said medium from said cassette, and b. selectively controlled power means for rotating said hub to wind said medium onto said hub.

* * * * *